United States Patent
Oyama

(10) Patent No.: US 10,355,835 B2
(45) Date of Patent: Jul. 16, 2019

(54) COMMUNICATION SYSTEM, BASE STATION, CONTROL APPARATUS, AND CONTROL METHOD FOR COMMUNICATION SYSTEM

(71) Applicant: FUJITSU LIMITED, Kawasaki-shi, Kanagawa (JP)

(72) Inventor: Teppei Oyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 15/347,210

(22) Filed: Nov. 9, 2016

(65) Prior Publication Data
US 2017/0134125 A1  May 11, 2017

(30) Foreign Application Priority Data

Nov. 11, 2015 (JP) .................................. 2015-221222

(51) Int. Cl.
*H04L 5/00* (2006.01)
*H04W 52/02* (2009.01)
(Continued)

(52) U.S. Cl.
CPC .......... *H04L 5/0032* (2013.01); *H04L 5/0075* (2013.01); *H04L 5/0091* (2013.01);
(Continued)

(58) Field of Classification Search
CPC ..... H04L 5/001; H04L 5/0032; H04L 5/0073; H04W 72/0433; H04W 72/0446; H04W 52/0206; H04W 72/082
See application file for complete search history.

(56) References Cited

U.S. PATENT DOCUMENTS

2010/0272004 A1* 10/2010 Maeda .................. H04L 5/0007
                                                        370/312
2011/0105163 A1*  5/2011 Lee ....................... H04W 72/08
                                                        455/501
(Continued)

FOREIGN PATENT DOCUMENTS

JP        2012-249106        12/2012
JP        2013-21603          1/2013
(Continued)

OTHER PUBLICATIONS

Fujitsu Limited, "Embarking on Mobile Communications systems for 2020 and beyond," IEEE/CIC International Conference on Communications in China 2015, (Nov. 2, 2015), 30 pages.
(Continued)

*Primary Examiner* — Edan Orgad
*Assistant Examiner* — Nourali Mansoury
(74) *Attorney, Agent, or Firm* — Fujitsu Patent Center

(57) ABSTRACT

A communication system including a plurality of radio base stations and a control apparatus coupled to the plurality of radio base stations, the control apparatus comprising a first memory and a first processor configured to determine at least one transmission pattern that indicates a combination of transmission states for each of the plurality of radio base stations at a specified timing, and transmit, to each of the plurality of radio base stations, control information including information that indicates an allocation of radio resources determined based on the at least one of transmission patterns, wherein each of the plurality of radio base stations are comprises a second memory and a second processor configured to execute, based on the control information, transmission control on a terminal that communicates with each of the plurality of radio base stations.

14 Claims, 12 Drawing Sheets

(51) Int. Cl.
*H04W 72/04* (2009.01)
*H04W 72/08* (2009.01)

(52) U.S. Cl.
CPC ... *H04W 52/0206* (2013.01); *H04W 72/0433* (2013.01); *H04W 72/0446* (2013.01); *H04W 72/082* (2013.01); *H04L 5/001* (2013.01); *H04L 5/0073* (2013.01); *Y02D 70/1262* (2018.01); *Y02D 70/1264* (2018.01)

(56) References Cited

U.S. PATENT DOCUMENTS

| | | | | |
|---|---|---|---|---|
| 2012/0218966 | A1* | 8/2012 | Yamazaki | H04W 48/16 370/329 |
| 2013/0017824 | A1 | 1/2013 | Rouffet et al. | |
| 2013/0084913 | A1* | 4/2013 | Gaal | H04W 52/40 455/522 |
| 2013/0201896 | A1* | 8/2013 | Ono | H04B 7/024 370/312 |
| 2013/0223258 | A1* | 8/2013 | Seo | H04W 24/02 370/252 |
| 2013/0246507 | A1* | 9/2013 | Amemiya | H04L 67/2814 709/203 |
| 2013/0288695 | A1 | 10/2013 | Okino | |
| 2014/0162662 | A1 | 6/2014 | Nagata et al. | |
| 2014/0219131 | A1* | 8/2014 | Yang | H04W 24/10 370/252 |
| 2014/0219132 | A1* | 8/2014 | Delveaux | H04L 12/4035 370/254 |
| 2015/0020157 | A1* | 1/2015 | Kim | H04W 76/30 726/3 |
| 2015/0071100 | A1* | 3/2015 | Yang | H04L 27/2666 370/252 |
| 2015/0288474 | A1* | 10/2015 | Fujishiro | H04J 11/0053 370/252 |
| 2015/0294388 | A1* | 10/2015 | Hu | G06F 17/30873 705/26.62 |
| 2015/0296359 | A1* | 10/2015 | Edge | H04W 4/02 455/404.2 |
| 2015/0296430 | A1* | 10/2015 | Bakker | H04W 36/0094 455/444 |
| 2016/0088485 | A1* | 3/2016 | Guo | H04W 28/16 370/329 |

FOREIGN PATENT DOCUMENTS

| | | |
|---|---|---|
| JP | 2013-509772 | 3/2013 |
| JP | 2015-29343 | 2/2015 |
| WO | 2011/054768 | 5/2011 |

OTHER PUBLICATIONS

JPOA—Office Action of Japanese Patent Application No. 2015-221222 dated Apr. 23, 2019 with Full Machine translation.

* cited by examiner

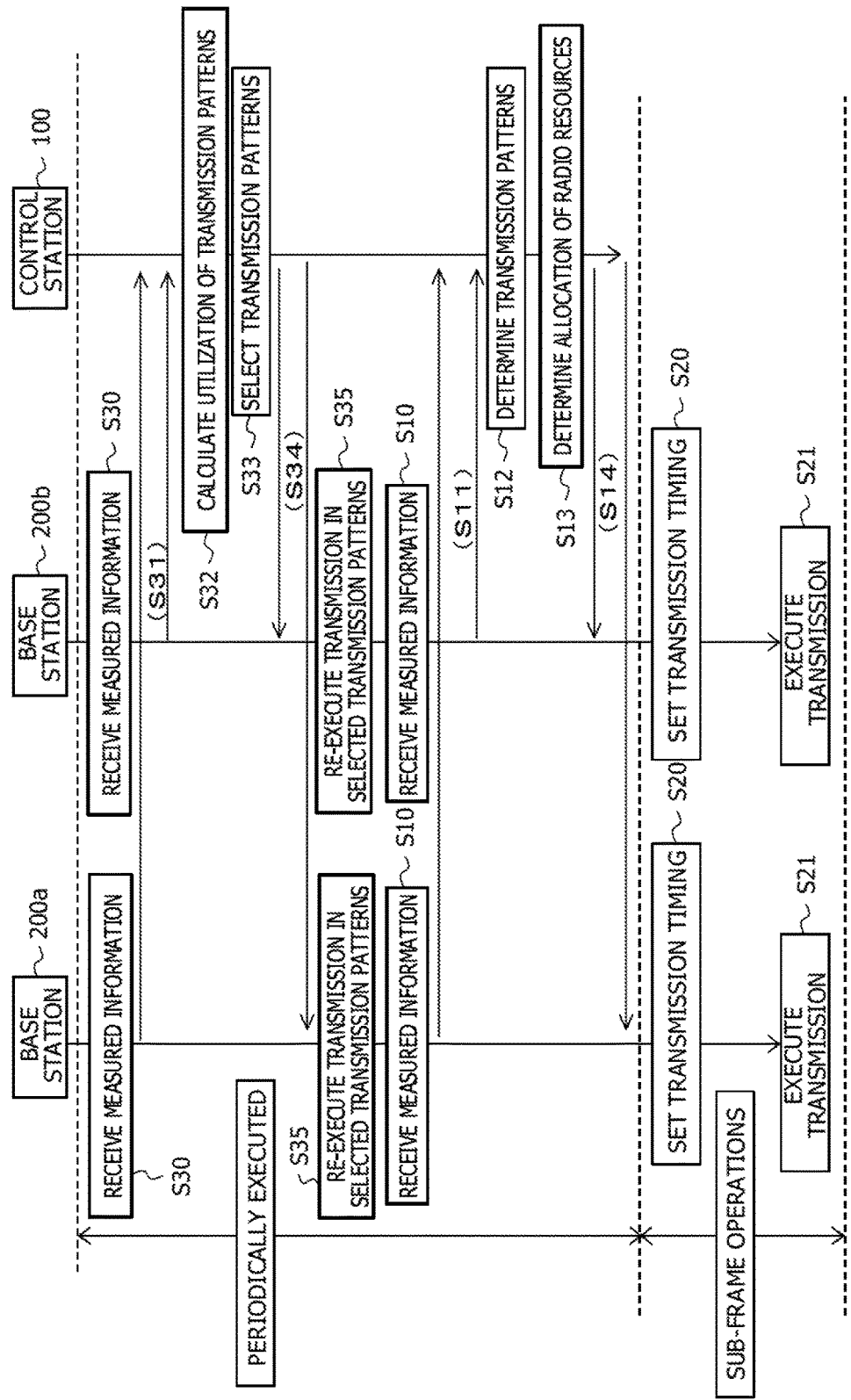

FIG. 9A

| PATTERN NUMBER k | $\beta(s)$ |
|---|---|
| 3 | 0.33 |
| 2 | 0.27 |
| 1 | 0.18 |
| 4 | 0.12 |
| ... (OTHERS) | 0.09~0.000 |

FIG. 9B

| PATTERN NUMBER k | $\beta(s)$ |
|---|---|
| 3 | 0.36 |
| 2 | 0.28 |
| 1 | 0.22 |
| 4 | 0.14 |

COMMUNICATION SYSTEM, BASE STATION, CONTROL APPARATUS, AND CONTROL METHOD FOR COMMUNICATION SYSTEM

CROSS-REFERENCE TO RELATED APPLICATION

This application is based upon and claims the benefit of priority of the prior Japanese Patent Application No. 2015-221222, filed on Nov. 11, 2015, the entire contents of which are incorporated herein by reference.

FIELD

The embodiments discussed herein are related to a communication system, a base station, a control station, and a control method for a communication system.

BACKGROUND

Currently, radio communication systems such as mobile phone systems and radio local area networks (LANs) are widely used. In the radio communication field, the next-generation communication technology is under discussion to further improve communication rates and communication capacities. For example, the 3rd Generation Partnership Project (3GPP) that is a standards organization has completed or is considering the standardization of the communication standard called Long Term Evolution (LTE) and the standardization of the communication standard called LTE-Advanced (LTE-A).

For LTE-A, the introduction of a heterogeneous network formed by combining radio communication of different types, different standards, and different ranges of coverage is in progress. For example, as illustrated in FIG. 12, a network in which a pico-cell base station 50b is overlaid with a macro-cell base station 50a exists.

The heterogeneous network has a problem with interference between base stations with different transmission power levels. In order to solve the interference between the base stations, a technique called enhanced inter-cell interference coordination (eICIC) is used for release 10 of LTE-A.

This technique is a method of repeating the turning on and off of transmission power of a macro-cell base station and causing a terminal to communicate with the base station and a small-cell base station based on the timing of the turning on and off in order to reduce interference between the macro-cell base station and the small-cell base station.

In addition, Japanese Laid-open Patent Publication No. 2015-29343 discloses a technique in which a certain base station that gives an effect of downlink interference to another base station determines a time division pattern composed of a first time resource and a second time resource limited so that the transmission power of the base stations in the second time resource is lower than those in the first time resource and the certain base station changes the time division pattern based on information on the utilization of resources of the other base station.

SUMMARY

According to an aspect of the invention, a communication system including a plurality of radio base stations, at least parts of cells of two or more radio base stations among the plurality of radio base stations overlapping each other or being adjacent to each other, and a control apparatus coupled to the plurality of radio base stations, the control apparatus including a first memory, and a first processor coupled to the first memory and the first processor configured to determine at least one transmission pattern that indicates a combination of transmission states for each of the plurality of radio base stations at a specified timing, the at least one of transmission state for one of the plurality of radio base stations, among the transmission states, indicating a state to decrease overlapping area of the cells, and transmit, to each of the plurality of radio base stations, control information including information that indicates an allocation of radio resources determined based on the at least one of transmission patterns, wherein each of the plurality of radio base stations are comprises a second memory, and a second processor coupled to the second memory and the second processor configured to execute, based on the control information, transmission control on a terminal that communicates with each of the plurality of radio base stations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a process sequence according to the second embodiment;

FIG. 9A is a diagram illustrating an example of the utilization $\beta(s)$ of each transmission pattern;

FIG. 9B is a diagram illustrating an example of the utilization $\beta(s)$ of each transmission pattern;

DESCRIPTION OF EMBODIMENTS

It is, however, considered that communication rates, communication capacities, and the like will be improved by increases in the number of base stations in order to achieve more comfortable communication in the future, for example. When the number of base stations is increased, it is expected that interference (between a macro-cell base station and a small-cell base station, for example) between base stations in the aforementioned heterogeneous network and interference between base stations that operate with transmission power levels equal to or newly equal to each other occur.

It is, therefore, preferable that a technique for controlling interference between base stations regardless of transmission power of the base stations be introduced.

The disclosure aims to provide a communication system, a base station, a centralized control station, and a method of controlling the control station that may reduce interference between base stations in a network and improve the throughput of the whole communication system.

Preferable embodiments of the techniques disclosed herein are described in detail below with reference to the accompanying drawings.

First Embodiment

Figure 1:
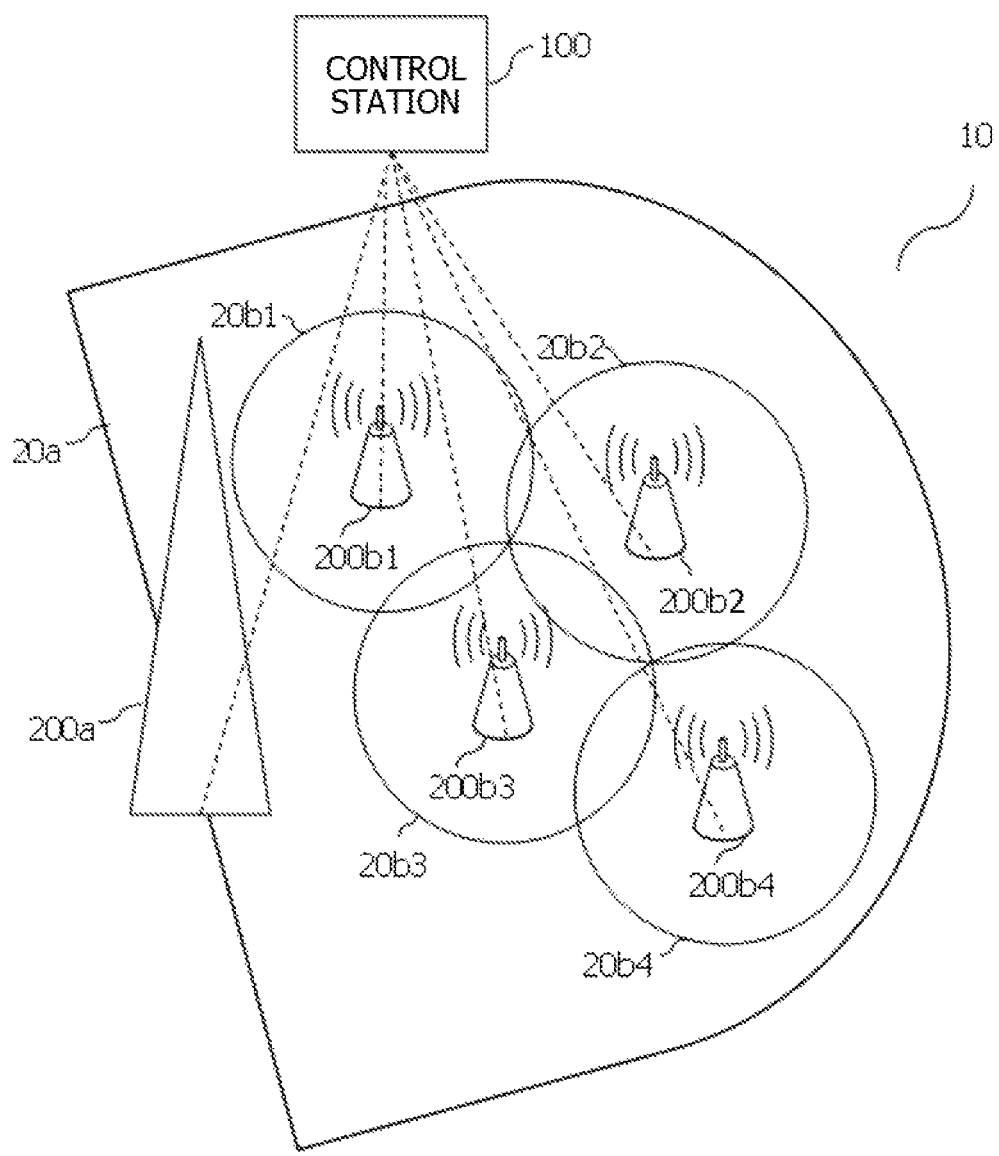
FIG. 1 is a diagram illustrating an example of the configuration of a network.

FIG. 1 illustrates an example of the configuration of a network 10.

The network 10 includes a control station 100 and base stations 200a, 200b1, 200b2, 200b3, and 200b4. When the base stations 200b1, 200b2, 200b3, and 200b4 are not distinguished from each other, the base stations 200b1, 200b2, 200b3, and 200b4 are merely referred to as base stations 200b.

The base station 200a is a high-power station, and the base stations 200b are low-power stations. For example, the high-power base station is a macro-cell base station, and the low-power base stations are pico-cell or femtocell base stations.

It is assumed that the base station 200a and the base stations 200b form a heterogeneous network as the network 10. When the base stations 200a and 200b are not distinguished from each other, the base stations 200a and 200b are merely referred to as base stations 200. The number of the base stations 200 is not limited. The network is described as the heterogeneous network as an example, but is not limited to this.

Transmission ranges of the base stations 200a, 200b1, 200b2, 200b3, and 200b4 are indicated by 20a, 20b1, 20b2, 20b3, and 20b4, respectively. When the transmission ranges 20b1, 20b2, 20b3, and 20b4 are not distinguished from each other, the transmission ranges 20b1, 20b2, 20b3, and 20b4 are merely referred to as transmission ranges 20b.

In addition, the transmission ranges 20a and 20b may increase with increases in the transmission power of the base stations 200. When the transmission ranges 20a and 20b are not distinguished from each other, the transmission ranges 20a and 20b are merely referred to as transmission ranges 20.

The control station 100 communicates with the base stations 200 and transmits a control signal to each of the base stations 200.

Each of the base stations 200 communicates with terminals located in the transmission range 20 of the base station 200.

Each of the base stations 200 receives the control signal from the control station 100.

Figure 2:
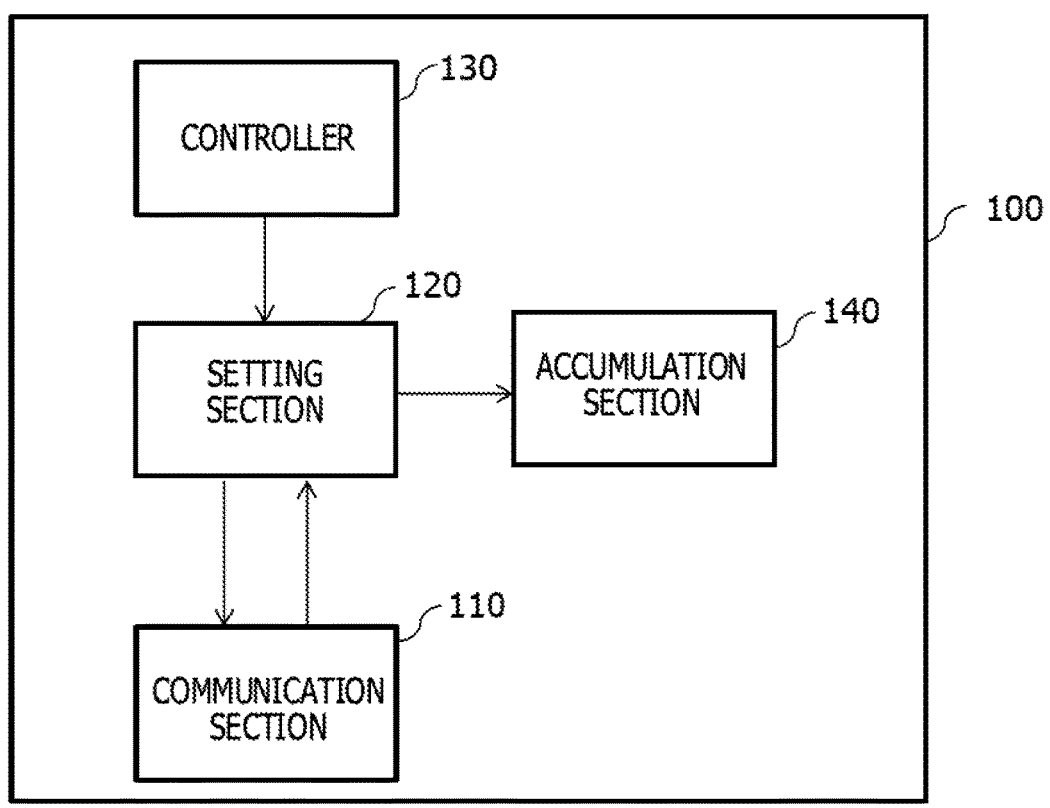
FIG. 2 is a block diagram illustrating an example of a functional configuration of a control station.

The control station 100 is described below. FIG. 2 is a block diagram illustrating an example of a functional configuration of the control station 100.

The control station 100 includes a communication section 110, a setting section 120, a controller 130, and an accumulation section 140.

The communication section 110 receives, from the base stations 200, measured information such as reception power measured by terminals located in the transmission ranges 20 and transmits the received measured information to the setting section 120. In addition, the communication section 110 transmits, as the control signal to the base stations 200, information that is related to radio communication between the base stations and the terminals and includes information that indicates the allocation of radio resources for each of transmission patterns (for example, ON and OFF patterns of the transmission power of the base stations 200) set by the setting section 120.

The transmission patterns indicate transmission states of all the base stations 200 and include transmission states of the base stations 200 at a certain time. A transmission pattern at the certain time includes the transmission states (the transmission state of each of the base stations 200) of the base stations 200 at the certain time and is a single pattern of the transmission states of the whole base stations 200.

The transmission states include ON and OFF states of the transmission power of the base stations 200 within the network 10, for example. For example, the transmission patterns may include a transmission pattern indicating a state in which the transmission power of all the base stations 100 within the network 10 is ON at a certain time and a transmission pattern indicating a state in which the transmission power of the base station 200a is OFF and the transmission power of the base station 200b is ON at a certain time.

In addition, the transmission states may include the transmission power levels of the base stations 200. For example, the transmission patterns may include a transmission pattern indicating a state in which the transmission power levels of all the base stations 200 within the network 10 are equal to a predetermined level at a certain time and a transmission pattern indicating a state in which each of the transmission power levels of all the base stations 200 within the network 10 is increased or reduced (or the radius of a cell of each of the base stations is increased or reduced) at a certain time.

The information that indicates the allocation of radio resources is information that indicates the allocation of radio resources to the base stations for each of the transmission patterns. The information that indicates the allocation of radio resources indicates the utilization of the transmission patterns allocated for predetermined time periods based on the measured information, for example.

The communication section 110 may be a communication interface such as a LAN interface, for example.

The setting section 120 sets, based on control by the controller 130, the allocation of radio resources for each of the transmission patterns using the information measured by the terminals within the transmission ranges 20 of the base stations 200 and transmitted from the communication section 110.

In addition, the setting section 120 transmits, to the accumulation section 140, information related to radio communication and including the measured information and the information indicating the allocation of radio resources. The information that indicates the allocation of radio resources may be information indicating the proportions of allocated radio resources to the total of available radio resources for each of the transmission patterns.

The controller 130 controls the setting section 120 and causes the setting section 120 to set the transmission patterns and the information indicating the allocation of radio resources for each of the transmission patterns.

Each of the setting section 120 and the controller 130 may be an integrated circuit such as an application specific integrated circuit (ASIC) or a field programmable gate array (FPGA), a digital signal processor (DSP), or a central processing unit (CPU), for example.

The accumulation section 140 accumulates information related to the network 10 and including the measured information and the information indicating the allocation of radio resources.

The accumulation section 140 is, for example, a random access memory (RAM), a read only memory (ROM), a semiconductor memory element such as a flash memory, or a storage device such as a hard disk or an optical disc.

Figure 3:
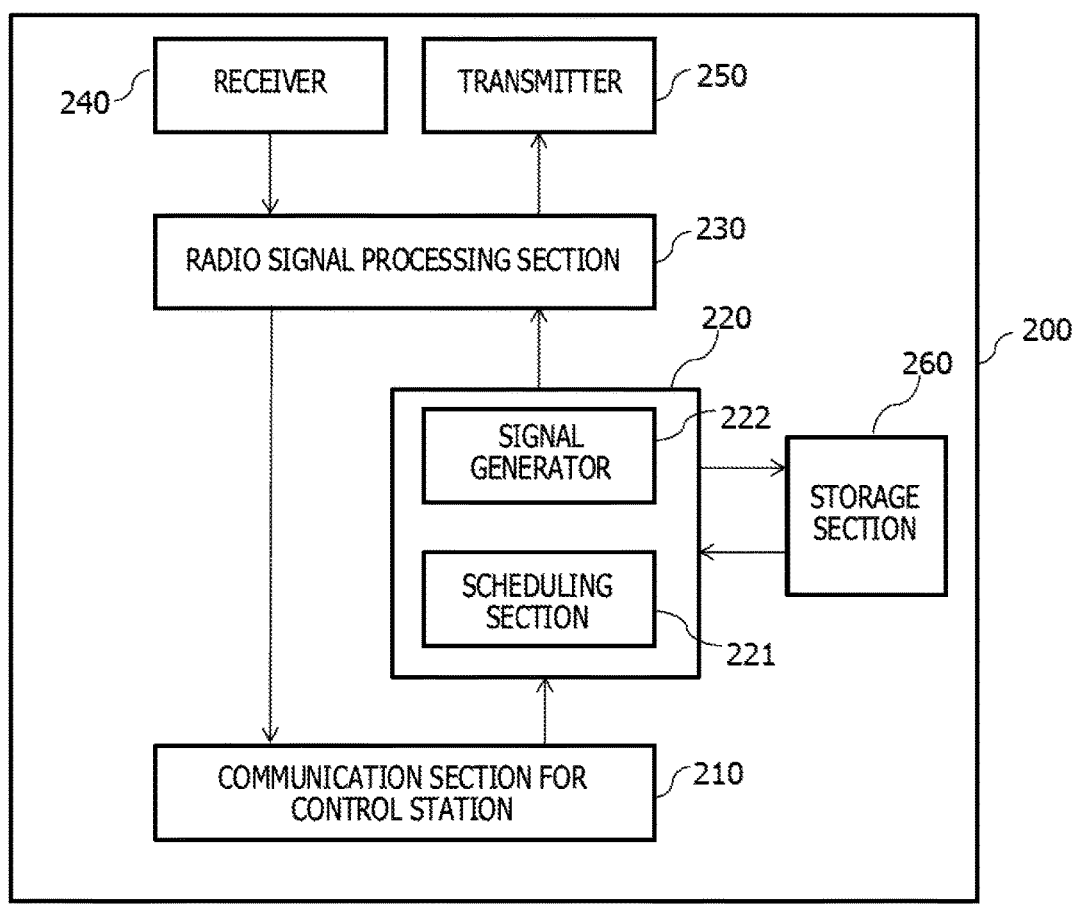
FIG. 3 is a block diagram illustrating an example of functional configurations of base stations.

Next, the base stations 200 are described. FIG. 3 is a block diagram illustrating an example of functional configurations of the base stations 200.

Each of the base stations 200 includes a communication section 210 for the control station, a transmission controller 220, a radio signal processing section 230, a receiver 240, a transmitter 250, and a storage section 260.

The communication section 210 for the control station receives the control signal from the control station 100 and transmits, to the transmission controller 220, information that is related to transmission executed in radio communication and includes the transmission patterns included in the control signal and the information indicating the allocation of radio resources and included in the control signal.

In addition, the communication section 210 for the control station processes signals including information measured by terminals and received by the radio signal processing section 230 from the terminals and transmits the processed signals as the measured information to the control station 100.

The communication section 210 for the control station may be a communication interface such as a LAN interface, for example.

The transmission controller 220 includes a scheduling section 221 and a signal generator 222 and controls signals to be transmitted by the base station 200 to the terminals.

The scheduling section 221 sets, based on the information indicating the allocation of radio resources and included in the control signal transmitted from the communication section 210 for the control station, the timing of the transmission by the base station 200 (for example, switches ON and OFF states of the transmission based on the information indicating the allocation of radio resources for the predetermined time periods).

The scheduling section 221 causes the timing of the transmission by the base station 200 to be stored in the storage section 260.

The signal generator 222 generates a reference signal (RS), a data signal, a control signal, and the like. The RS is used as a signal for the measurement.

Each of the scheduling section 221 and the signal generator 222 may be an integrated circuit such as an application specific integrated circuit (ASIC) or a field programmable gate array (FPGA), a digital signal processor (DSP), or a central processing unit (CPU), for example.

The radio signal processing section 230 processes the signals generated by the signal generator 222 so that the processed signals are to be transmitted as radio signals.

In addition, the radio signal processing section 230 processes a radio signal received by the receiver 240 so that the processed radio signal is to be processed in the base station 200 or the like.

The radio signal processing section 230 may be a radio frequency (RF) circuit, for example.

The receiver 240 receives signals from terminals located in the transmission range 20 of the base station 200 and transmits the received signals to the radio signal processing section 230.

The transmitter 250 transmits the radio signals processed by the radio signal processing section 230 to the terminals located in the transmission range 20 of the base station 200.

The receiver 240 and the transmitter 250 may form an antenna, for example. In addition, the receiver 240 and the transmitter 250 may be replaced with a transceiver.

The storage section 260 stores control information of the base station 200 such as the result of the scheduling by the scheduling section 221 and information related to radio communication such as the state of the network 10.

The storage section 260 is, for example, a random access memory (RAM), a read only memory (ROM), a semiconductor memory element such as a flash memory, or a storage device such as a hard disk or an optical disc.

Figure 4:
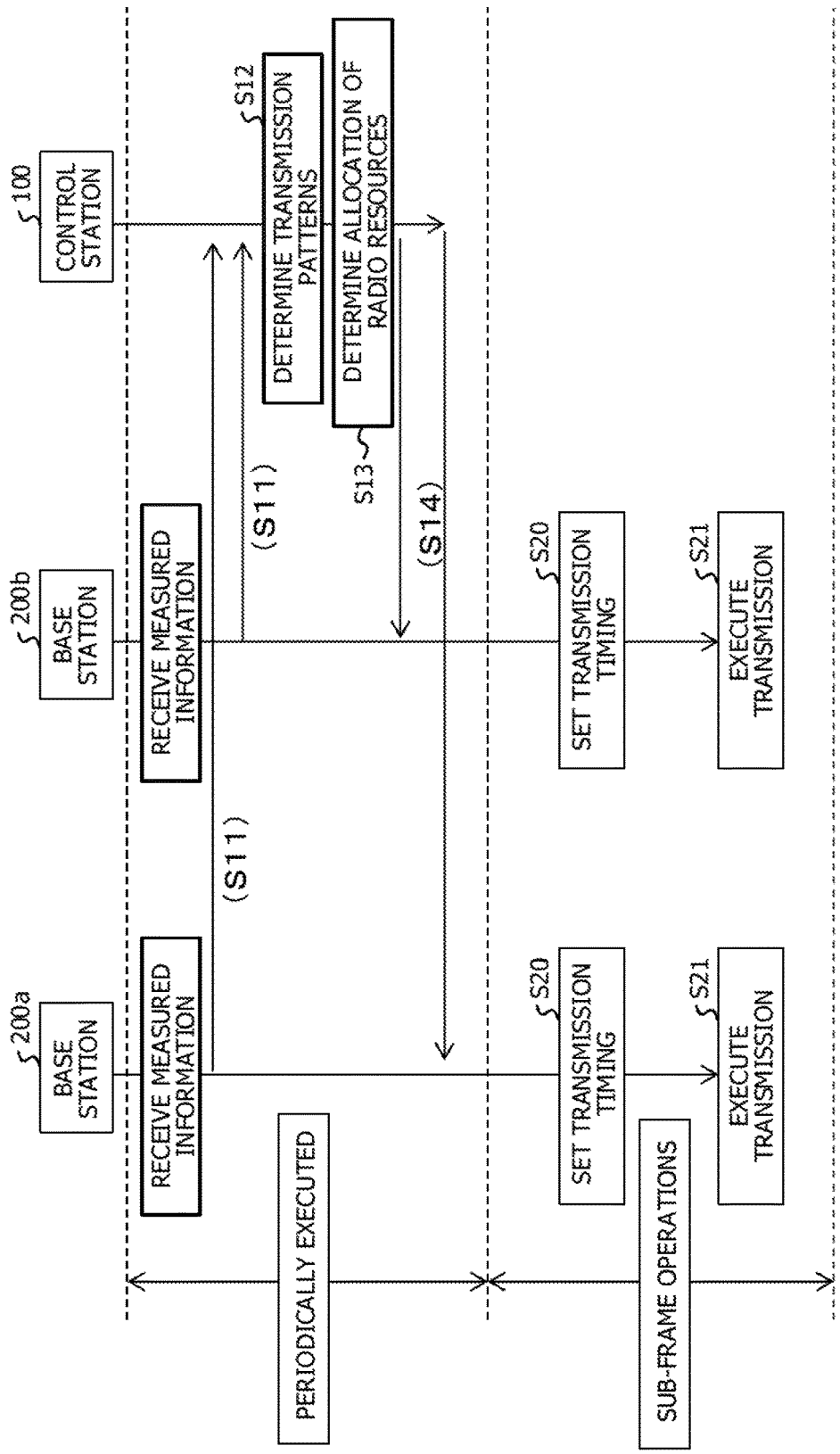
FIG. 4 is a diagram illustrating an example of a process sequence according to a first embodiment.

Operations of the control station 100 and operations of the base stations 200 are described using an exemplary process sequence illustrated in FIG. 4.

First, the base stations 200 transmit, from the transmitters 250, RSs generated by the signal generators 222 to terminals located in the transmission ranges 20 of the base stations 200. The RSs are transmitted for the measurement as an example, but are not limited. It is sufficient if the base stations 200 transmit signals whose qualities are able to be measured.

The terminals measure the qualities (for example, reception power or the like) of the RSs received by the terminals and transmit the measured qualities as measured information to the base stations 200 that transmitted the RSs.

When the base stations 200 receive the measured information by the receivers 240 from the terminals (in step S10), the radio signal processing sections 230 execute signal processing on the measured information, and the communication sections 210 for the control station transmit the processed measured information to the control station 100 (in step S11).

When the communication section 110 of the control station 100 receives the measured information from the base stations 200, the setting section 120 of the control station 100 determines, based on the measured information, transmission patterns (in step S12) and the allocation of radio resources for each of the transmission patterns (in step S13).

When the transmission patterns and the allocation of radio resources for each of the transmission patterns are determined, the communication section 110 transmits, to the base stations 200, information indicating the allocation of radio resources for each of the transmission patterns as the control signal (in step S14). Since the ON and OFF states of the transmission power of the base stations 200 in each of the transmission patterns may be different for the base stations 200, the control signal that includes the information indicating the allocation of radio resources to the base stations 200 is used. For example, the control station 100 transmits, to the base station 200*a*, information indicating the allocation of radio resources to the base station 200*a* and transmits, to the base station 200*b*, information indicating the allocation of radio resources to the base station 200*b*. If transmission patterns in which the ON and OFF patterns of the transmission power of the base stations are the same are applied, the control signal may include information indicating the allocation of the same radio resources to the base stations 200 and may be used for the base stations 200.

By repeatedly (for example, periodically) executing steps S10 to S14, the transmission patterns may be changed based on changes in conditions, such as the movements of the terminals.

The base stations 200 receive the control signal by the communication sections 210 for the control station, set the timing of the switching of the transmission patterns by the scheduling sections 221 based on the information indicating the allocation of radio resources and included in the control signal (in step S20), and communicate with the terminals located in the transmission ranges 20 (in step S21). The timing of the switching may be set based on the utilization of the transmission patterns for the predetermined time periods.

An example of the transmission patterns and the switching in the network 10 is described with reference to FIG. 5. In the example illustrated in FIG. 5, four transmission patterns 1 to 4 are illustrated, solid lines indicate transmission ranges 20 and the ON states of the transmission power, and dotted lines indicate transmission ranges 20 and the OFF states of the transmission power. In the transmission pattern 1, the transmission power of all the base stations 200 is ON. In the transmission pattern 2, only the transmission power of the base station 200a is OFF. In the transmission pattern 3, only the transmission power of the base station 200b1 is OFF. In the transmission pattern 4, the transmission power of the base stations 200a and 200b3 is OFF.

The transmission patterns may be determined based on a predetermined requirement.

For example, the predetermined requirement is that the transmission power of a half or more of the base stations 200 is ON in all the transmission patterns or that the transmission power of the base stations 200 is ON in any of the transmission patterns.

Figure 5:
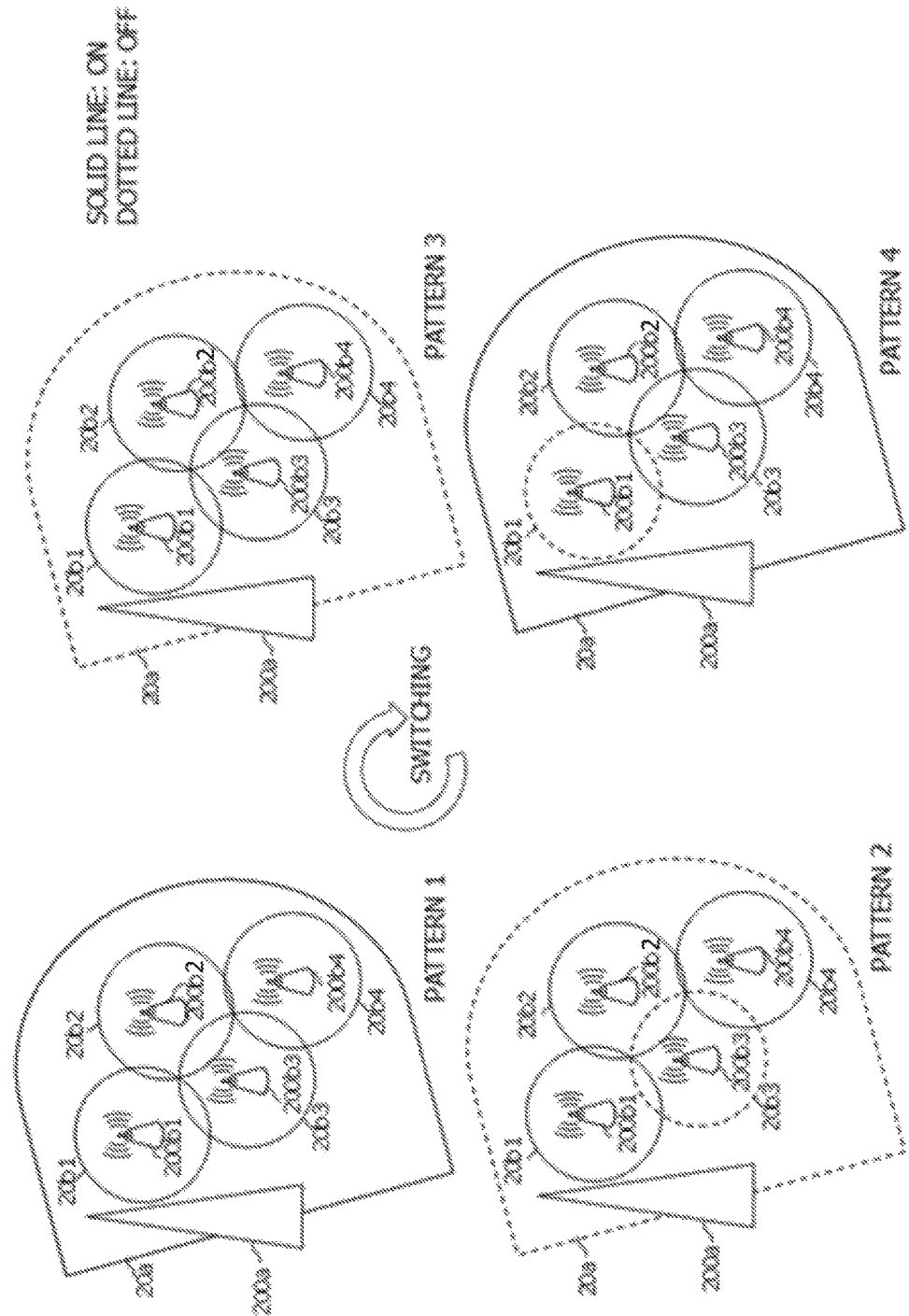
FIG. 5 is a diagram illustrating an example of the setting of transmission patterns in the network.

In the transmission pattern 1 illustrated in FIG. 5, a terminal located in a region in which at least parts of transmission ranges 20 of base stations 200 overlap each other receives interference from another base station 200.

In the transmission pattern 2 illustrated in FIG. 5, interference received by the base stations 200b from the base station 200a is reduced by turning off the transmission power of the base station 200a.

In the transmission pattern 3 illustrated in FIG. 5, interference received by the base stations 200b2 and 200b3 from the base station 200b1 is reduced by turning off the transmission power of the base station 200b1.

In the transmission pattern 4 illustrated in FIG. 5, interference received by the base stations 200b1, 200b2, and 200b4 from the base stations 200a and 200b3 is reduced by turning off the transmission power of the base stations 200a and 200b3.

Since the transmission pattern to be used is switched between the transmission patterns 1 to 4 illustrated in FIG. 5, communication may be executed in each of the transmission patterns 1 to 4 in which interference between base stations 200 is reduced in a case where terminals and the base stations 200 communicate with each other.

Figure 6:
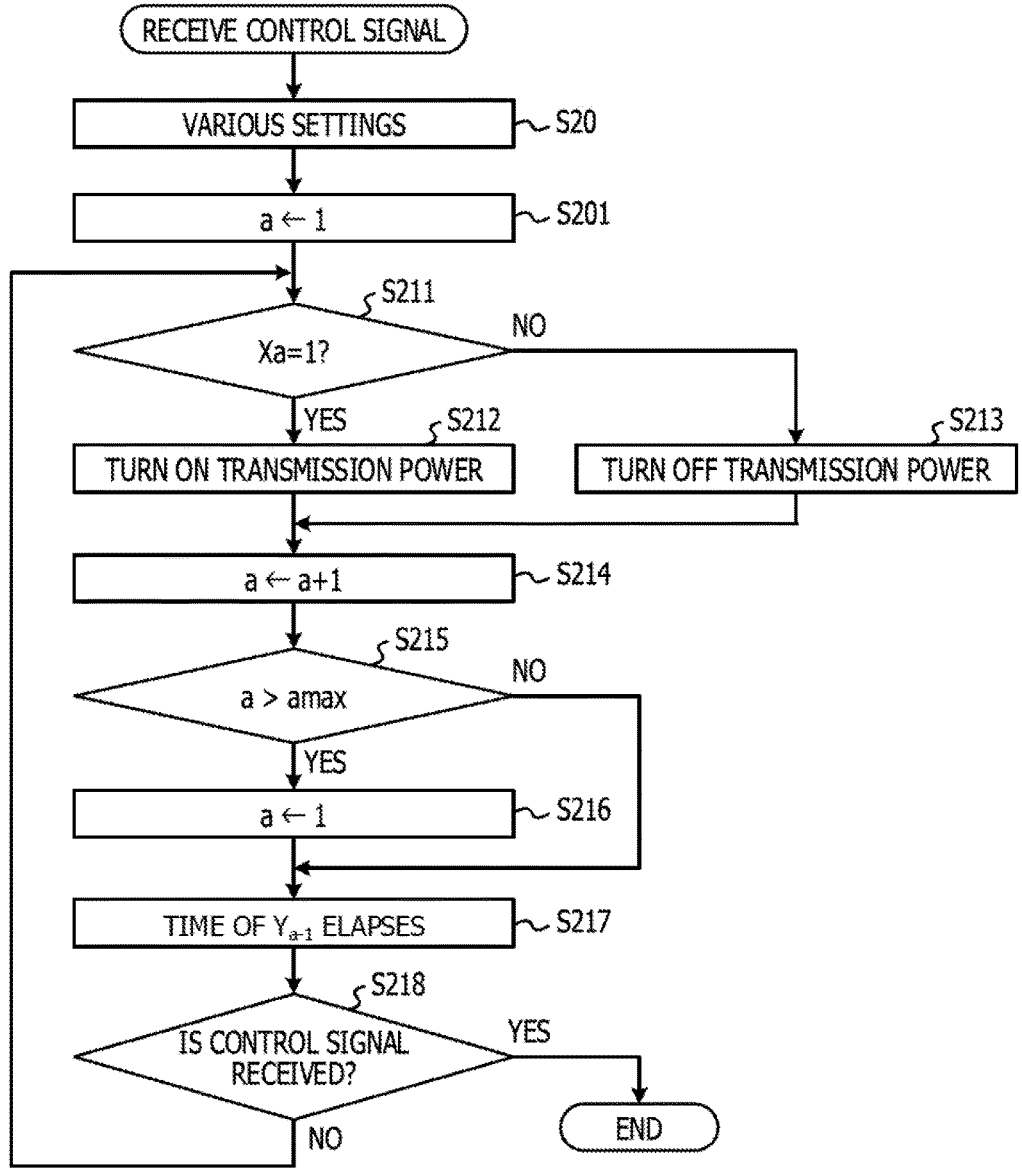
FIG. 6 is a flowchart of an example of a process to be executed after the base stations receive a control signal from the control station.

In addition, an example of the control of the switching of the transmission patterns by the base stations 200 is described with reference to a flowchart of FIG. 6. The switching of the transmission patterns may be achieved by turning on and off the transmission power.

When receiving the control signal from the control station 100, each of the base stations 200 executes various settings (in step S20). In the various settings, the number (the four transmission patterns in the example illustrated in FIG. 5) of transmission patterns is set in amax, and $X_a$ indicating the ON (1) and OFF (0) states of the transmission power of the base stations 200 in each of the transmission patterns and $Y_a$ indicating the utilization of the transmission patterns for the predetermined time periods based on the allocation of radio resources for each of the transmission patterns are set. $Y_a$ may be set as a time.

It is assumed that the ON states of the transmission power of the base stations 200 in a transmission pattern $X_a$ are indicated by 1, while the OFF states of the transmission power of the base stations 200 in the transmission pattern $X_a$ are indicated by 0.

After each of the base stations 200 executes step S20, the base station 200 stores 1 in a (in step S201) and confirms whether or not $X_a$ is 1 (in step S211).

If $X_a$ is 1 (Yes in step S211), the base station 200 turns on the transmission power (in step S212).

If $X_a$ is 0 (No in step S211), the base station 200 turns off the transmission power (in step S213).

After step S212 or S213, the base station 200 stores a+1 in a (step S214) and confirms whether or not a is larger than amax (in step S215).

If a is larger than amax (Yes in step S215), the base station 200 stores 1 in a (in step S216).

When a time corresponding to $Y_{a-1}$ elapses after step S212 or S213 (in step S217), the base station 200 confirms whether or not the base station 200 received a new control signal (in step S218).

When receiving the new control signal (Yes in step S218), the base station 200 terminates the transmission executed under the current settings.

If the base station 200 did not receive the new control signal (No in step S218), the process returns to step S211.

Steps S211 to S218 are the process of step S21 of the process sequence illustrated in FIG. 4.

Since the base stations 200 turn on and off the transmission power at times based on the information indicating the allocation of radio resources by the control station 100 as described above, interference between the base stations 200 may be reduced and the throughput of the whole communication system may be improved.

The turning on and off of the transmission power is described above, but is not limited to this. The interference may be reduced by adjusting the levels of the transmission power while the transmission power is ON. For example, the transmission power of a certain base station 200 may be reduced, instead of the turning off of the transmission power of the certain base station 200. In addition, the transmission power of a base station 200 within a cell in which interference is low may be increased. In such a case, the control station 100 transmits, to a base station 200, a control signal including information indicating that the transmission power is to be increased or reduced.

In addition, the setting section 120 may set, for each of the transmission patterns, terminals with which the base stations 200 communicate. In this case, the control station 100 may notify the base stations 200 of information on the terminals with which the base stations 200 communicate, and the scheduling sections 221 may set, for each of the transmission patterns based on the notified information, the terminals with which the base stations 200 communicate. Thus, the throughput may be further improved.

Second Embodiment

In the first embodiment, the control station 100 determines the transmission patterns based on the predetermined requirement and sets the timing of the switching of the transmission patterns based on the radio resource allocation based on the measured information. In a second embodiment, a control station 100 selects transmission patterns from among a plurality of transmission patterns (for example, all transmission patterns) based on information measured by terminals.

Figure 7:
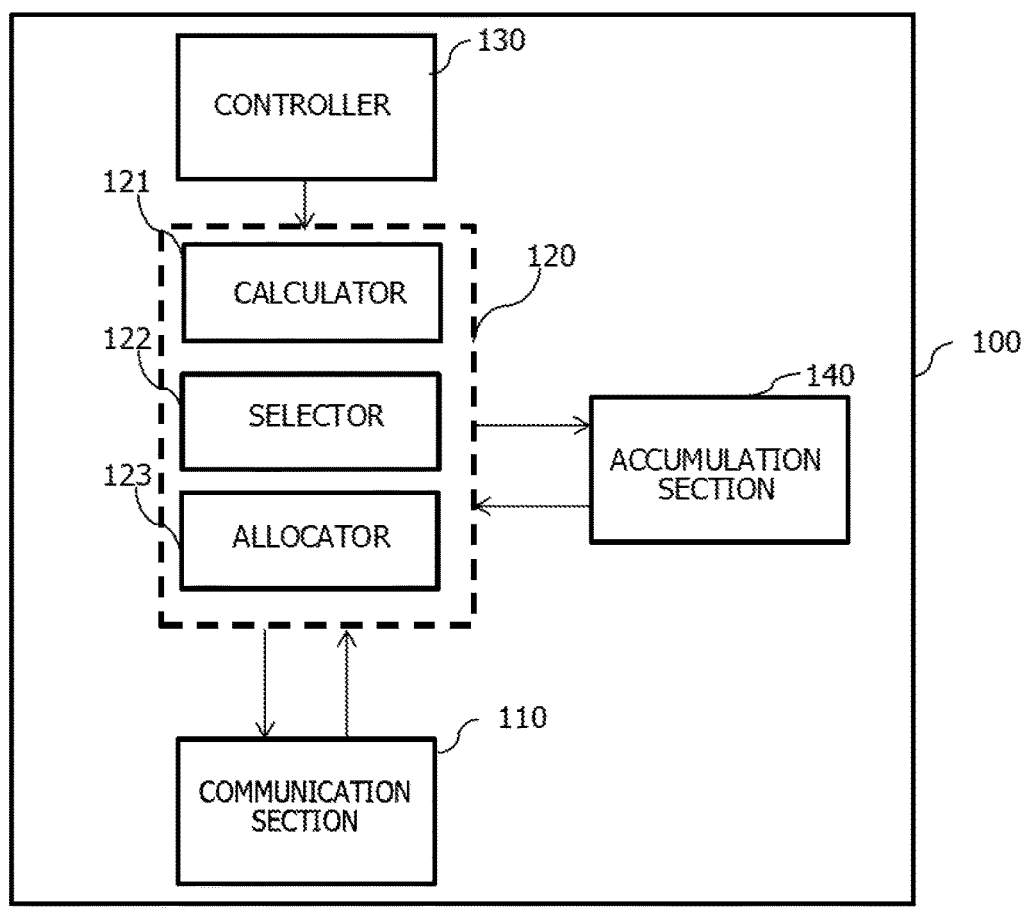
FIG. 7 is a block diagram illustrating an example of a functional configuration of a control station according to a second embodiment.

FIG. 7 is a block diagram illustrating an example of a functional configuration of the control station 100 according to the second embodiment.

As illustrated in FIG. 7, the control station 100 according to the second embodiment includes a communication section 110, a setting section 120, a controller 130, and an accumulation section 140. A description of configurations that are the same as those of the control station 100 according to the first embodiment is omitted.

The setting section 120 includes a calculator 121, a selector 122, and an allocator 123.

The calculator 121 calculates throughput for each of transmission patterns based on information measured by terminals and transmitted from the base stations 200.

The selector 122 uses the results of calculating the throughput by the calculator 121 to select transmission patterns from which throughput that is equal to or larger than a predetermined value is obtained.

The allocator 123 sets the allocation of radio resources for each of the transmission patterns selected by the selector 122.

Operations of the control station 100 according to the second embodiment and operations of the base stations 200 are described with reference to an exemplary process sequence illustrated in FIG. 8.

In FIG. 8, processes that are the same as or similar to those illustrated in FIG. 4 are indicated by the same reference symbols as those illustrated in FIG. 4. When receiving measured information from terminals (in step S30), the base stations 200 transmit the measured information to the control station 100 (in step S31). When the control station 100 receives the information measured by the terminals from the base stations 200, the calculator 121 of the control station 100 calculates the utilization of the transmission patterns (in step S32).

If ON and OFF patterns of the transmission power of the base stations 200 are considered and the number of the base stations 200 is x, the number of the transmission patterns is $2^x$. For example, in the network 10, the number of the transmission patterns is $2^5=32$.

A method of calculating the utilization of the transmission patterns is described below.

In order for the calculator 121 to calculate expected throughput $R_{n, m, s}$ in cases where the transmission patterns are used, reception qualities $SINR_{n, m, s}$ when terminals (n) communicate with an m-th base station 200 in transmission patterns s are calculated by the calculator 121 using reception power $P_{n, j}$ included in information measured by the terminals (n), between the terminals (n) and a base station 200(j) as follows. As a noise component, $N_{th}$ is used.

$$SINR_{n,m,s} = P_{n,m,s}/(N_{th} + \Sigma_{j=m} P_{n,j,s}) \quad \text{(Equation 1)}$$

The calculator 121 uses the Shannon theorem (or the Shannon-Hartley theorem) to calculate the expected throughput $R_{n, m, s}$ from the reception qualities $SINR_{n, m, s}$ obtained by Equation 1.

$$R_{n,m,s} = W \log(1 + SINR_{n,m,s}/\alpha) \quad \text{(Equation 2)}$$

In Equation 2, W is the bandwidth of a data signal, α is a coefficient indicating deterioration from the Shannon theorem and is, for example, a value of 2.0.

Next, rates $p_{n, m, s}$ at which the terminals (n) communicate with the m-th base station 200 in the transmission patterns s are calculated.

The calculator 121 calculates $p_{n, m, s}$ by solving a proportional fairness (PF) utility maximization problem expressed by the following Equation 3, for example.

$$U = \frac{1}{N} \sum_{n \in UE} \log \left\{ \sum_{s \in Ptn} \sum_{m \in Cell(n)} R_{n,m,s} p_{n,m,s} \right\} \quad \text{(Equation 3)}$$

$$\sum_{n \in UE(m)} p_{n,m,s} = \beta(s) \quad \text{(Equation 4)}$$

$$\sum_{s \in Ptn} \beta(s) = 1 \quad \text{(Equation 5)}$$

$$p_{n,m,s} \geq 0 \quad \text{(Inequality 6)}$$

Equations 4 and 5 and Inequality 6 indicate requirements for solving Equation 3. When Equation 3 is solved using Equations 4 and 5 and Inequality 6, the following Equations 7 and 8 are calculated.

$$p_{n,m,s} = \max(0, 1/\mu_{m,s} - T'_{n,m,s}/R_{n,m,s}) \quad \text{Equation (7)}$$

$$T'_{n,m,s} = \sum_{t \in UE} \left( \sum_{j \in Cell(n)} R_{n,j,t} p_{n,j,t} \right) - R_{n,m,s} p_{n,m,s} \quad \text{Equation (8)}$$

In this case, m∈Cell(n), and s∈Ptn.

Symbols used in Equations 3 to 5, 7, and 8 and Inequality 6 are described below. Cell is a set of all base stations 200, UE is a set of all terminals, Cell(n) is a set of candidate coordinating base stations 200 for the terminals (n), UEm (UE is user equipment) is a set of UE that may communicate with candidate coordinating base stations 200 including the base station 200(m), and β(s) is the utilization of the transmission patterns s. Cell(n) or the set of candidate coordinating base stations 200 for the terminals (n) may be all base stations 200 with which the terminals (n) may communicate and that are able to measure reception power. Alternatively, it is considered that the number of the candidate coordinating base stations 200 is reduced by selecting a predetermined number of candidate coordinating base stations 200 in order from the highest reception power. In addition, $\mu_m$ is a variable indicating a height in the water pouring theorem.

For example, if a plurality of streams (or channels) with certain total power are provided, the water pouring theorem is a theorem in which power is allocated to each of the streams so that a communication capacity is at the maximum level. According to the water pouring theorem, the communication capacity is maximized by allocating power higher than a threshold to a good stream and allocating power lower than the threshold to a poor stream.

In this manner, $p_{n, m, s}$ is calculated. In addition, an example of a detailed method of calculating β(s) and $p_{n, m, s}$ is described below.

When the process of calculating $p_{n, m, s}$ is started, β(s) and $p_{n, m, s}$ are initialized as follows.

$$\beta(s) = 1/N_{Ptn} \quad \text{(Equation 9)}$$

$$p_{n,m,s} = 1/NN_{Ptn} \quad \text{(Equation 10)}$$

Next, $p_{n, m, s}$ and $\mu_{m, s}$ are updated using the water pouring theorem in Equations 4 and 7.

Then, $\mu_{m, s}$ is updated to the following Equation 11.

$$\mu_{m,s} = \frac{\bar{\mu}}{\sum_{j \in Cell} \mu_{j,s}} \mu_{m,s} \quad \text{(Equation 11)}$$

In Equation 11, $\bar{\mu}$ is expressed by the following Equation 12.

$$\bar{\mu} = \frac{1}{N_{ptn}} \sum_{s \in ptn} \sum_{j \in Cell} \mu_{j,s} \quad \text{(Equation 12)}$$

Then, $p_{n, m, s}$ is updated using Equation 7 again.

After the update of $p_{n, m, s}$, $\beta(s)$ is updated to the following Equation 13.

$$\beta(s) = \frac{\sum_{i \in UE} \sum_{j \in Cell} p_{i,j,s}}{\sum_{s \in ptn} \sum_{i \in UE} \sum_{j \in Cell} p_{i,j,s}} \quad \text{(Equation 13)}$$

By executing the aforementioned processes, the utilization $\beta(s)$ of the transmission patterns is calculated. FIG. 9A illustrates an example of the results of calculating $\beta(s)$ of the transmission patterns in the network 10. The transmission patterns 1 to 4 are the transmission patterns used in the first embodiment. In addition, the utilization of transmission patterns other than the transmission patterns 1 to 4 is smaller than 0.1. The transmission patterns other than the transmission patterns 1 to 4 are described as others.

Return to the process sequence illustrated in FIG. 8. When $\beta(s)$ of the transmission patterns is calculated, the selector 122 selects transmission patterns whose utilization $\beta(s)$ is equal to or larger than a predetermined value (in step S33).

In the example illustrated in FIG. 9A, the selector 122 selects transmission patterns whose utilization $\beta(s)$ is equal to or larger than 0.1, for example. The selector 122 may select a predetermined number of transmission patterns in order from the highest utilization $\beta(s)$.

When the selector 122 selects the transmission patterns, the allocator 123 determines the allocation of radio resources to the base stations 200 based on the selected transmission patterns and the utilization of the selected transmission patterns. Then, the communication section 110 transmits, to the base stations 200, information indicating the allocation of the radio resources as control information (in step S34). The base stations 200 retransmit RSs to the terminals based on the information included in the received control information and indicating the allocation of the radio resources (in step S35) and receive information on the measured RSs from the terminals (in step S10).

A process sequence after the aforementioned processes is the same as or similar to the process sequence illustrated in FIG. 4.

In the determination of the allocation of radio resources for each of the transmission patterns in step S13, the calculator 121 calculates $\beta(s)$ according to Equations 3 to 8, and the allocator 123 uses the results of the calculation to determine the allocation of radio resources for each of the transmission patterns. For example, as illustrated in FIG. 9B, when the transmission patterns and the utilization of the transmission patterns are determined, the control station 100 determines the allocation of radio resources to the base stations 200 based on the determined transmission patterns and the determined utilization.

The control station 100 may determine, based on $p_{n, m, s}$ for each of the transmission patterns, a pattern in which the base station 200 communicates with the terminals (n).

In this case, the control station 100 selects a rate $p_{n, m, s}$ indicating a value equal to or larger than a predetermined value from among the rates $p_{n, m, s}$. The control station 100 determines, based on the selected $p_{n, m, s}$, the allocation of radio resources so that the terminals (n) communicate with the m-th base station 200 in the transmission patterns s, and the control station 100 causes the control signal to include information indicating the allocation of the radio resources and notifies the base stations 200 of the control signal.

An example of a method of executing the aforementioned process is described below. The control station 100 calculates a PF metric $M_s$ for each of the transmission patterns from the utilization of the transmission patterns in the communication of the terminals (n) and the utilization of each of the transmission patterns in the whole system and searches a transmission pattern $s_{max}$ for which the largest PF metric $M_s$ is calculated. The PF metrics $M_s$ are calculated by the calculator 121.

The PF metrics $M_s$ indicate easily understandable data (values) converted by executing calculation and analysis. For example, the PF metrics $M_s$ may be the ratios of the utilization of predetermined transmission patterns (for example, the transmission pattern 1 and the like) to the average utilization of a plurality of transmission patterns and expressed by the following Equation 14.

$$M_s = \beta(s)/\overline{\beta}(s) \quad \text{(Equation 14)}$$

In Equation 14, $\overline{\beta}(s)$ is an average allocation rate calculated using a variable $O''(s)$ that indicates 1 if a forgetting factor $\varepsilon$ and a pattern s are selected and indicates 0 if this is not the case, and $\overline{\beta}(s)$ is expressed by the following Equation 15.

$$\overline{\beta}(s)^{n+1} = (1-\varepsilon)\overline{\beta}(s)^n + \varepsilon O''(s) \quad \text{(Equation 15)}$$

UE whose PF metric is the largest among a set UE(m, $s_{max}$) of UE belonging to the transmission pattern $s_{max}$ is selected for each of cells, as expressed by Equation 16.

$$UE = \max_{j \in UE(m, s_{max})} \frac{R_j}{\overline{R}_J} \quad \text{(Equation 16)}$$

As described above, the transmission pattern $s_{max}$ may be calculated from the transmission patterns s, and transmission patterns to be used by the terminals may be selected. When the transmission patterns to be used by the terminals are determined, the base stations 200 receive the control signal from the control station 100 and set the transmission patterns to be used by the terminals upon the setting of transmission patterns and the like in step S20 of the process sequence illustrated in FIG. 8.

The timing of the switching of the transmission patterns of the base stations 200 may be controlled based on relationships between the actual utilization $\beta'(s)$ of the transmission patterns and the calculated utilization $\beta(s)$ of the transmission patterns.

A method of controlling the timing is described below. The actual utilization $\beta'(s)$ of the transmission patterns is compared with the calculated utilization $\beta(s)$, and the current transmission pattern is switched to a certain transmission pattern whose actual utilization $\beta'(s)$ is equal to or lower than the calculated utilization $\beta(s)$ of the certain transmission pattern.

For example, if the utilization $\beta(s)$ of the transmission patterns 1, 2, 3, and 4 illustrated in FIG. 5 is 0.40, 0.25, 0.20, and 0.15, and the actual utilization $\beta'(s)$ of the transmission patterns 1, 2, 3, and 4 at a certain time is 0.42, 0.21, 0.21, and 0.157, the transmission pattern 2 whose actual utilization β'(s) does not reach the calculated utilization β(s) of the transmission pattern 2 is selected upon the next switching. If a plurality of transmission patterns whose actual utilization β'(s) does not reach calculated utilization β(s) of the plurality of transmission patterns, a transmission pattern whose actual utilization β'(s) is different by the largest value than calculated utilization β(s) of the transmission pattern is selected.

Thus, the switching of the transmission patterns may be executed based on the utilization β(s).

As described above, in the second embodiment, the utilization of each of the transmission patterns is calculated, transmission patterns whose utilization is high are selected, and radio resources are allocated to the base stations 200 for each of the selected transmission patterns. Thus, interference between the base stations 200 may be reduced, and the throughput may be improved.

In addition, transmission patterns whose utilization is to be measured in order to select transmission patterns may be randomly selected from all the transmission patterns, and the utilization of the transmission patterns may be measured. Thus, the transmission patterns are selected without the calculation of the utilization β(s) of all the transmission patterns whose number is $2^x$. Thus, a load caused by the calculation by the calculator 121 may be reduced. In the random selection, transmission patterns that satisfy a predetermined requirement may be selected.

The predetermined requirement may be a requirement for the number of base stations 200 whose transmission power is turned on, a requirement for a multiple (for example, the double of the number of transmission patterns in which the transmission power of all the base stations 200 is ON, or the double of the number of transmission patterns to be selected) of the number of transmission patterns to be used for radio communication, or the like.

If the predetermined requirement is used, the number of transmission patterns to be compared and a transmission pattern (for example, a transmission pattern in which only the transmission power of the base station 200a is ON) that is not to be compared are clear upon the random selection, and the number of transmission patterns to be randomly selected may be reduced.

Third Embodiment

In the second embodiment, the control station 100 solves the PF utility maximization problem based on the reception power indicated in the measured information, calculates β(s), and selects the transmission patterns. A third embodiment describes a method of setting transmission patterns based on traffic information of terminals that is included in base stations 200.

Configurations of a control station 100 and base stations 200 described in the third embodiment are the same as or similar to those described in the second embodiment.

In the third embodiment, the control station 100 calculates average throughput $\overline{R}_n$ from the traffic information of the terminals (n) that is included in the base stations 200. If the average throughput $\overline{R}_n$ is smaller than expected average throughput $R_n$ with respect to actual traffic, the control station 100 uses a function h(x) to calculate Equation 17.

$$U = \frac{1}{N}\sum_{n \in UE} h(R_n) = \frac{1}{N}\sum_{n \in UE} h\left(\left\{\sum_{s \in Ptn}\sum_{m \in Cell(n)} R_{n,m,s} p_{n,m,s}\right\}\right) \quad \text{(Equation 17)}$$

The function h(x) is a ramp function that indicates a value equal to or smaller than $\overline{R}_n$. The function h(x) is expressed by Equation 18.

$$h(x) = \{x(x < \overline{R}_n), \overline{R}_n(x \geq \overline{R}_n)\} \quad \text{(Equation 18)}$$

As described above, in the third embodiment, the selection of the transmission patterns and the switching of the transmission patterns may be executed based on the traffic information by replacing an objective function of the PF utility maximization problem.

Fourth Embodiment

In the second embodiment, the control station 100 selects transmission patterns whose utilization is high from among a plurality of transmission patterns, and the control station 100 allocates radio resources based on the selected transmission patterns and the utilization of the selected transmission patterns and sets the timing of the switching of the transmission patterns. In the third embodiment, the control station 100 selects the transmission patterns based on a requested traffic amount and switches the transmission patterns. In a fourth embodiment, the control station 100 calculates the utilization of transmission patterns based on the accuracy of measured values indicated in measured information and the moving velocities of terminals. The fourth embodiment describes a method of calculating the utilization from the reception power described in the second embodiment, but is not limited to this.

For example, the reception power, to be used as measured information, of a terminal that moves at a high speed may change within a short time period at a high probability, and it is expected that the state of the terminal upon the measurement of the reception power by the terminal is different from the state of the terminal upon the execution of the selection of transmission patterns by the control station 100. Thus, the reception power upon the measurement may be different from the reception power upon the execution.

Thus, the control station 100 uses weights $W_n$ for the terminals (n) to calculate the PF utility function used in Equation 3.

$$U = \frac{1}{N}\sum_{n \in UE} W_n \log\left\{\sum_{s \in Ptn}\sum_{m \in Cell(n)} R_{n,m,s} p_{n,m,s}\right\} \quad \text{(Equation 19)}$$

The weights $W_n$ are, for example, expressed by the following Equation 20 using a certain value $v_0$ and moving velocities $v_n$ of the terminals n.

$$W_n = \min\{1, v_0/v_n\} \quad \text{(Equation 20)}$$

For example, the weights $W_n$ may be based on measurement errors caused by low performance of the terminals and may be expressed by the following Equation 21 using a certain value $e_0$ and the measurement errors $e_n$ of the terminals n.

$$W_n = \min\{1, e_0/e_n\} \quad \text{(Equation 21)}$$

As described above, in the four embodiment, the weights $W_n$ are used for expected throughput to be calculated using the PF utility, and transmission patterns based on the states of the terminals and the timing of the switching may be set.

Fifth Embodiment

A fifth embodiment describes a method based on joint transmission (JT).

In the fifth embodiment, the control station 100 calculates SINRs and expected throughput in two cases that are a case where the JT is executed and a case where the JT is not executed. Thus, by using the SINRs (expressed by Equation 1) in the case where the JT is not executed, the expected throughput (expressed by Equation 2) in the case where the JT is not executed, SINRs (expressed by the following Equation 22) in the case where the JT is executed, expected throughput (expressed by the following Equation 23) in the case where the JT is not executed, and SINRs (expressed by the following Equation 24) of the receiving terminals in the case where the JT is executed, the PF utility is defined as Equation 25 and the maximization problem is solved. Equations 26 to 28 and Inequality 29 indicate requirements for solving the maximization problem.

$$SINR_{n,m,l,s} = \frac{P_{n,m,s} + P_{n,l,s}}{N_{th} + \sum_{j \neq m,l} P_{n,j,s}}$$ (Equation 22)

$$R_{n,m,l,s} = W\log(1 + SINR_{n,m,l,s}/\alpha)$$ (Equation 23)

$$SINR_{n,m,l,s} = \frac{P_{n,m,s} + 2\sqrt{P_{n,m,s}P_{n,l,s}} + P_{n,l,s}}{N_{th} + \sum_{j \neq m,l} P_{n,j,s}}$$ (Equation 24)

(Equation 25)
$$U = \frac{1}{N}\sum_{n \in UE} \log\left\{\sum_{s \in Ptn}\left(\sum_{m \in Cell(n)} R_{n,m,s}p_{n,m,s} + \sum_{\substack{m,l \in Cell(n) \\ m \neq l}} R_{n,m,l,s}p_{n,m,l,s}\right)\right\}$$

$$\sum_{n \in UE(m)} p_{n,m,s} = \beta(s)\{1 - \alpha(m,s)\}$$ (Equation 26)

$$\sum_{\substack{n \in UE(m,l) \\ l \in Cell(n)}} p_{n,m,l,s} = \beta(s)\alpha(m,s)$$ (Equation 27)

$$\sum_{s \in Ptn} \beta(s) = 1$$ (Equation 28)

$$p_{n,m,s} \geq 0, p_{n,m,l,s} \geq 0$$ (Inequality 29)

The following equations are calculated by solving Equation 25 using Equations 26 to 28 and 30 and Inequality 29.

$$p_{n,m,s} = \max(0, 1/\mu_{m,s} - T'_{n,m,s}/R_{n,m,s})$$ (Equation 30)

$$T'_{n,m,s} = \sum_{t \in Ptn}\left(\sum_{j \in Cell(n)} R_{n,j,t}p_{n,j,t} + \sum_{j,k \in Cell(n)} R_{n,j,k,t}p_{n,j,k,t}\right) - R_{n,m,s}p_{n,m,s}$$ (Equation 31)

$$p_{n,m,l,s} = \max(0, 1/(\mu_{m,s} + \mu_{l,s}) - T'_{n,m,l,s}/R_{n,m,l,s})$$ (Equation 32)

$$T'_{n,m,l,s} = \sum_{t \in Ptn}\left(\sum_{j \in Cell(n)} R_{n,j,t}p_{n,j,t} + \sum_{j,k \in Cell(n)} R_{n,j,k,t}p_{n,j,k,t}\right) - R_{n,m,l,s}p_{n,m,l,s}$$ (Equation 33)

In this case, m∈Cell(n), and s∈Ptn. Equations 30 and 32 indicate requirements for Equations 31 and 33.

Symbols included in Equations 22 to 28, Inequality 29, and Equations 30 to 33 are described. $SINR_{n,m,l,s}$ and $R_{n,m,l,s}$ are SINRs and expected throughput that are obtained when the terminals n communicates with the m-th base station 200 and an l-th base station 200 that coordinate with each other in a transmission pattern s; UE(m, l) is a set of UE that may communicate with candidate transmitting base stations 200 including the m-th base station 200 and the l-th base station 200; and α(m, s) is the proportion of radio resources with which the m-th base station executes the joint transmission in the transmission pattern s to the total of the available radio resources.

In addition, an example of a detailed method of calculating $p_{n,m,s}$, $p_{n,m,l,s}$, β(s), and α(m, s) is described below.

When the process of the calculation is started, $p_{n,m,s}$, $p_{n,m,l,s}$, β(s), and α(m, s) are initialized. In this case, $p_{n,m,s}$ and β(s) are expressed by Equations 9 and 10, respectively. $p_{n,m,l,s}$ and α(m, s) are initialized to 0.

Next, $p_{n,m,s}$ and $\mu_{m,s}$ are updated using the water pouring theorem in Equations 26 and 31.

After that, $p_{n,m,l,s}$ is updated using Equation 32, and α(m, s) is updated using Equation 27.

In addition, $\mu_{m,s}$ is updated to Equation 11, and $p_{n,m,s}$ and $p_{n,m,l,s}$ are updated using Equations 31 and 32 again.

After the update, β(s) is updated to the following Equation 34.

$$\beta(s) = \frac{\sum_{i \in UE}\sum_{j \in Cell} p_{i,j,s} + \sum_{i \in UE}\sum_{j,k \in Cell} p_{i,j,k,s}}{\sum_{s \in Ptn}\left(\sum_{i \in UE}\sum_{j \in Cell} p_{i,j,s} + \sum_{i \in UE}\sum_{j,k \in Cell} p_{i,j,k,s}\right)}$$ (Equation 34)

By the aforementioned processes, β(s) of the transmission patterns is calculated based on coordination and non-coordination for the terminals, and transmission patterns are selected based on the calculated β(s).

The PF utility maximization problem is solved using the selected transmission patterns again (Equations 26 to 28, Inequality 29, and Equations 30 to 34 are calculated for each of the transmission patterns), β(s) of the transmission patterns that is based on coordination and non-coordination for the terminals in the selected transmission patterns is calculated, and coordination rates and the allocation of the terminals are determined.

For example, in the calculation of the PF metrics used to determine the allocation of terminals and described in the second embodiment, PF metrics for non-coordination and coordination are calculated, and the largest PF metric is selected. This method is described below.

First, a PF metric $M_s'$ is calculated for each of the transmission patterns, and a transmission pattern s for which the largest PF metric is calculated is searched. Each of the PF metrics $M_s'$ is expressed by the following Equation 35 using average utilization $\bar{\beta}'$.

$$M_s' = \beta(s)/\bar{\beta}'(s)$$ (Equation 35)

In addition, $\bar{\beta}(s)$ is expressed by the following Equation 36 using a variable $O^n(s)$ that indicates 1 if the forgetting factor E and the transmission pattern s are selected and indicates 0 if this is not the case.

$$\bar{\beta}'(s)^{n+1} = (1-\varepsilon)\bar{\beta}(s)^n + \varepsilon O^n(s)$$ (Equation 36)

Next, for a combination of the coordinating base stations 200, the rate $O_m(S_{max})$ (expressed by Equation 37) of non-coordination of the base station 200(m) in the transmission pattern for which the largest PF metric is calculated and the rate $O_{m,l}(S_{max})$ (expressed by Equation 38) of coordination of the base station $200(m)$ with the base station $200(l)$ in the transmission pattern for which the largest PF metric is calculated are calculated, and a non-coordination metric $M_m(S_{max})$ (expressed by Equation 39) and a coordination metric $M_{m,l}(S_{max})$ (expressed by Equation 40) are calculated using average allocation rates $\overline{O}_m(S_{max})$ and $\overline{O}_{m,l}(S_{max})$.

$$O_m(S_{max}) = \sum_{n \in UE(m)} p_{n,m,s_{max}} \quad \text{(Equation 37)}$$

$$O_{m,l}(S_{max}) = \sum_{\substack{n \in UE(m,l) \\ l \in Cell(n)}} p_{n,m,l,s_{max}} \quad \text{(Equation 38)}$$

$$M_m(s_{max}) = \frac{O_m(s_{max})}{\overline{O}_m(s_{max})} \quad \text{(Equation 39)}$$

$$M_{m,l}(s_{max}) = \frac{O_{m,l}(s_{max})}{\overline{O}_{m,l}(s_{max})} \quad \text{(Equation 40)}$$

Then, if a coordination metric is the largest among $M_m(S_{max})$ and $M_{m,l}(S_{max})$, a coordinating base station $200$ $(I_{max})$ is calculated. After that, UE that is among a set $UE(m, I_{max}, S_{max})$ of UE and communicates with the base station $200(m)$ and the base station $200(I_{max})$ that execute the joint transmission and cause the largest coordination metric is calculated according to the following Equation 41.

$$UE = \max_{j \in UE(m,I_{max},s_{max})} \frac{R_j}{\tilde{R}_J} \quad \text{(Equation 41)}$$

If a non-coordination metric is the largest among $M_m(S_{max})$ and $M_{m,l}(S_{max})$, UE that causes the largest PF utility is calculated according to Equation 16.

The average allocation rate is updated according to Equation 42 using a variable $O^n$ indicating "1" if the base station $200(m)$ and the base station $200(l)$ execute the joint transmission and indicating "0" if this is not the case.

$$\overline{O}_{m,l}{}^{n+1}(s) = (1-\varepsilon)\overline{O}_{m,l}(S) + \beta O^n \quad \text{(Equation 42)}$$

As described above, in the fifth embodiment, since the calculation is executed based on the JT, transmission patterns that cause high throughput may be set.

Sixth Embodiment

A sixth embodiment describes a case where a plurality of frequencies is used.

When the plurality of frequencies is used, expected throughput is calculated based on frequency components. In addition, it is preferable that the PF utility be calculated based on a set of frequencies in a whole frequency band.

The frequency components indicate component carriers in LTE-A.

As described above, in the sixth embodiment, transmission patterns may be selected based on the whole frequency band in the case where the plurality of frequencies is used.

Seventh Embodiment

A seventh embodiment describes a case where transmission patterns that are different for frequency resources are used.

The control station 100 selects a transmission pattern for each of the plurality of frequency resources, calculates the utilization of the selected transmission patterns, and controls the turning on and off of the transmission power of the base stations for each of the frequency resources.

For example, a certain base station 200 may be set so that the transmission power of the certain base station 200 is turned on in a transmission pattern for a frequency resource 1 and turned off in a transmission pattern for a frequency resource 2. In this case, the base station 200 turns on the transmission power for the frequency resource 1 and turns off the transmission power for the frequency resource 2. In addition, the timing of the switching of the transmission patterns may vary for each of the frequency resources.

As described above, in the seventh embodiment, a transmission pattern is selected for each of the plurality of frequency resources, the allocation of radio resources is set for each of the plurality of frequency resources, and the throughput may be improved.

Another Embodiment

Figure 10:
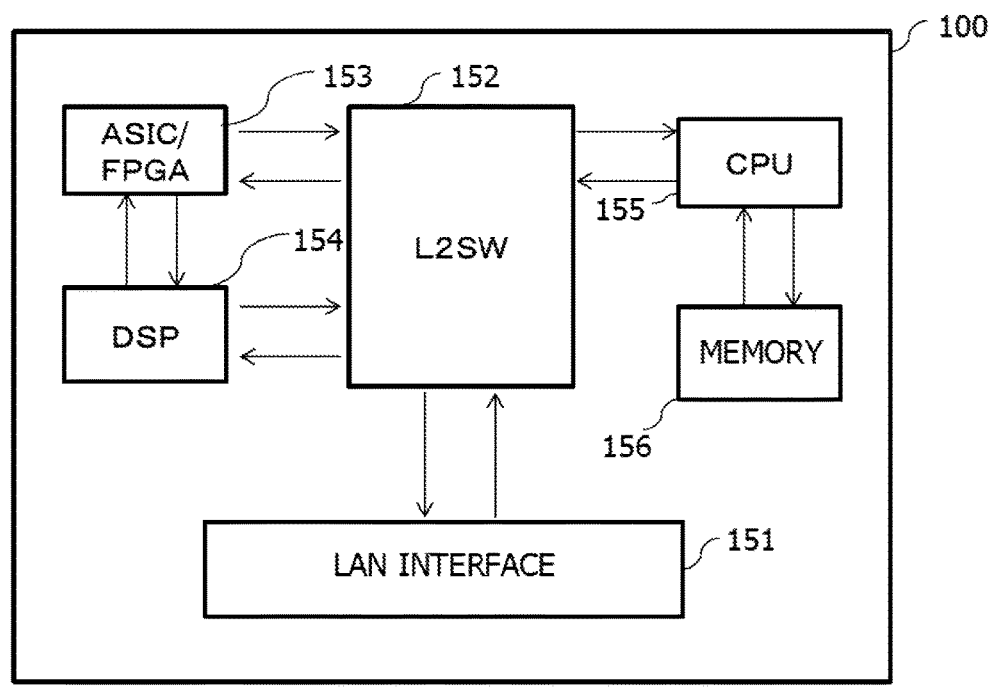
FIG. 10 is a diagram illustrating an example of hardware configurations of the control stations.

FIG. 10 is a diagram illustrating an example of hardware configurations of the control stations 100. Each of the control stations 100 includes a LAN interface 151, an L2SW (layer 2 switch) 152, an ASIC/FPGA 153, a DSP 154, a CPU 155, and a memory 156.

The LAN interface 151 is, for example, an interface module for enabling the control station 100 to communicate with the base stations 200 and corresponds to the communication section 110.

The L2SW (layer 2 switch) 152 controls the transmission of signals between the LAN interface 151, the ASIC/FPGA 153, the DSP 154, and the CPU 155.

The ASIC/FPGA 153 is an integrated processing circuit and defined or designed to execute processing based on specifications of the control station 100.

The DSP 154 executes processing on digital signals.

The ASIC/FPGA 153 and the DSP 154 are controlled by the CPU 155 and execute the processes of the setting section 120, for example.

The CPU 155 controls the operations of the whole control station 100. The CPU 155 corresponds to the control of the setting section 120 by the controller 130.

The memory 156 temporarily stores data to be used in the control station 100 and stores a program for executing the operations of the control station 100.

The memory 156 corresponds to the accumulation section 140 for storing information on the network 10, for example.

Next, an example of hardware configurations of the base stations 200 is described.

Figure 11:
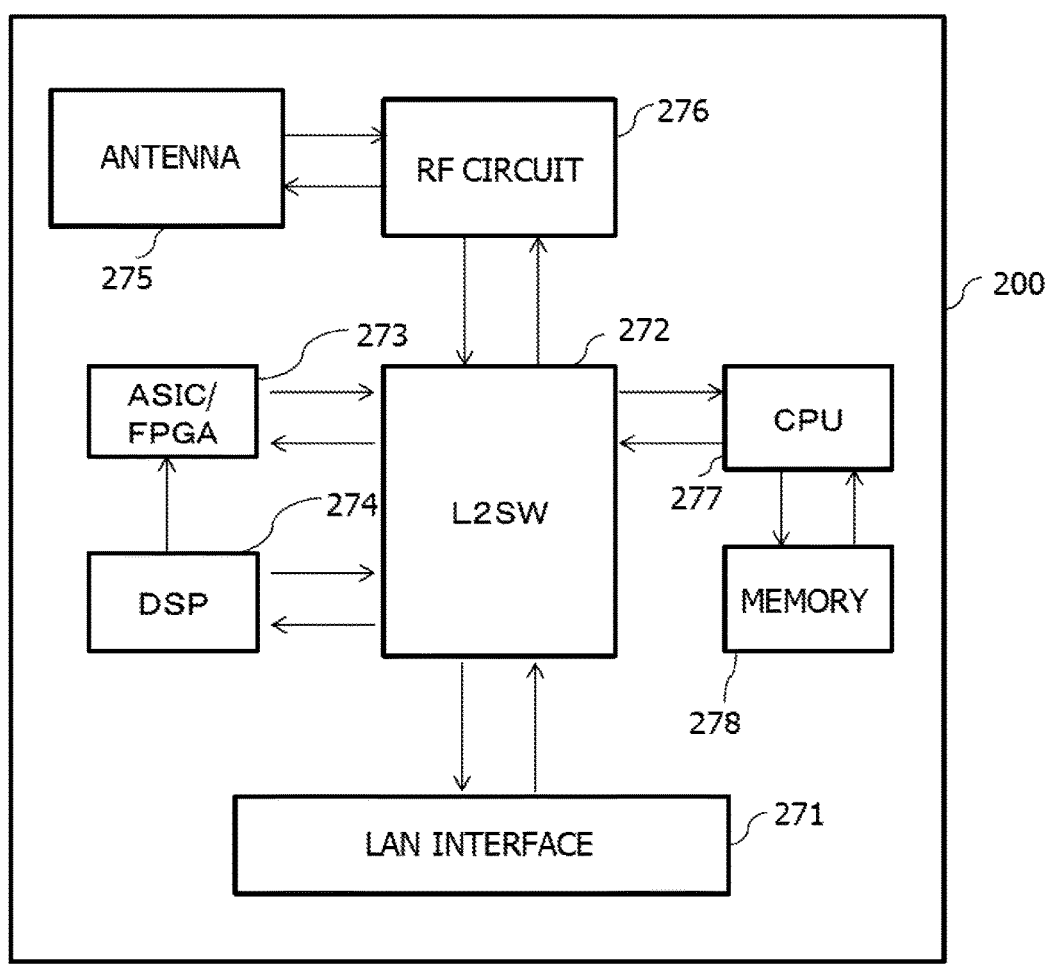
FIG. 11 is a diagram illustrating an example of hardware configurations of the base stations.
Figure 12:
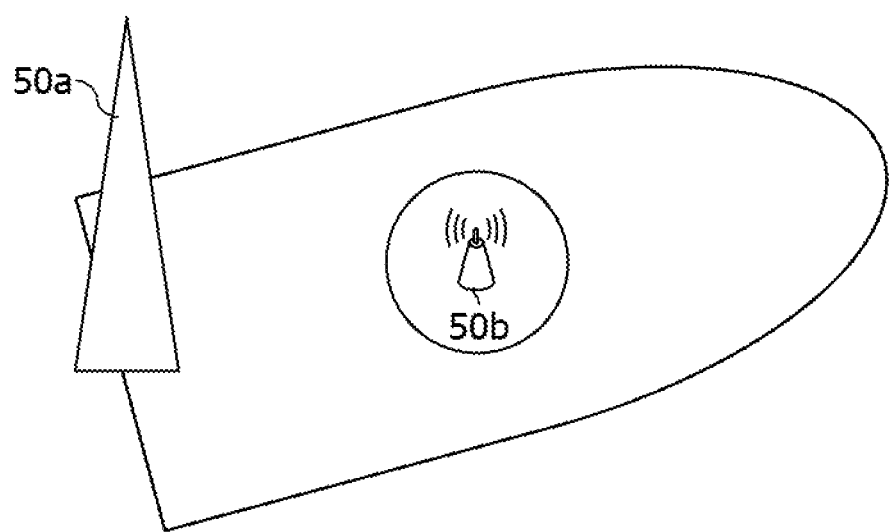
FIG. 12 is a diagram illustrating an example of a heterogeneous network.

FIG. 11 is a diagram illustrating an example of the hardware configurations of the base stations 200. Each of the base stations 200 includes a LAN interface 271, an L2SW 272, an ASIC/FPGA 273, a DSP 274, an antenna 275, an RF circuit 276, a CPU 277, and a memory 278.

The LAN interface 271 is, for example, an interface module for enabling the base station 200 to communicate with the control station 100 and corresponds to the communication section 210 for the control station.

The L2SW 272 controls the transmission of signals between the LAN interface 271, the ASIC/FPGA 273, the DSP 274, the RF circuit 276, and the CPU 277.

The ASIC/FPGA 273 is an integrated processing circuit and defined or designed to execute processing based on specifications of the base station 200.

The DSP 274 executes processing on digital signals.

The ASIC/FPGA 273 and the DSP 274 are controlled by the CPU 277 and execute the processes of the transmission controller 220.

The antenna 275 wirelessly communicates with terminals located in the transmission range 20 of the base station 200 and corresponds to the receiver 240 and the transmitter 250, for example.

The RF circuit 276 executes a transmission and reception process on a radio signal received by the antenna 275 and a radio signal to be transmitted from the antenna 275 and corresponds to the radio signal processing section 230.

The CPU 277 controls the operations of the whole base station 200. The CPU 277 controls the processes of the signal generator 222 and scheduling section 221 of the transmission controller 220.

The memory 278 stores information related to radio communication and including data to be used in the base station 200, transmission patterns, and the like. The memory 278 also stores a program for executing the operations of the base station 200.

The memory 278 corresponds to the accumulation section 260 for storing information set by the scheduling section 221, for example.

The methods described in the first to seventh embodiments are achieved by the hardware configurations described above.

The preferable embodiments are described using the transmission system within the network, but are not limited to the above description and may be modified and changed by those skilled in the art based on the gist described in claims or disclosed herein, and it goes without saying that the modifications and changes of the embodiments are included in the scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a plurality of radio base stations, at least parts of cells of two or more radio base stations among the plurality of radio base stations overlapping each other or being adjacent to each other; and
   a control apparatus coupled to the plurality of radio base stations, the control apparatus comprising:
      a first memory; and
      a first processor coupled to the first memory and the first processor configured to:
         select, based on information that was measured by terminals coupled to at least one of the plurality of radio base stations and was acquired from the at least one of the plurality of radio base stations, a transmission pattern whose utilization is high from among a plurality of transmission patterns, the transmission pattern that indicates a combination of transmission states for each of the plurality of radio base stations at a specified timing, at least one transmission state for one of the plurality of radio base stations, among the transmission states, indicating a state to decrease overlapping area of the cells; and
         transmit, to each of the plurality of radio base stations, control information including information that indicates an allocation of radio resources determined based on the selected transmission pattern; wherein
   each of the plurality of radio base stations are comprises:
      a second memory; and
      a second processor coupled to the second memory and the second processor configured to:
         execute, based on the control information, transmission control on a terminal that communicates with each of the plurality of radio base stations.

2. The communication system according to claim 1, wherein the transmission states include ON and OFF states of transmission power of the plurality of radio base stations or transmission power levels of each of the plurality of radio base stations.

3. The communication system according to claim 1, wherein the first processor is configured to:
   determine based on information that was measured by terminals coupled to at least one of the plurality of radio base stations and was acquired from the at least one of the plurality of radio base stations, the allocation of radio resources for each of a plurality of transmission patterns indicating different transmission states of the plurality of radio base stations.

4. The communication system according to claim 3, wherein the first processor is configured to:
   determine at least one transmission pattern among the plurality of transmission patterns; and
   transmit the control information including information of radio resources with which the plurality of radio base stations communicates with coupled terminals in the determined transmission pattern.

5. The communication system according to claim 3, wherein the measured information is reception power reported by the coupled terminals to the radio base stations; and
wherein the first processor is configured to:
   determine, based on the reception power, the allocation of radio resources for each of the plurality of transmission patterns.

6. The communication system according to claim 3, wherein the first processor is configured to:
   determine the allocation of radio resources using proportional fairness (PF) utility based on the measured information.

7. The communication system according to claim 6, wherein the first processor is configured to:
   provide a weight based on the accuracy of the measured information upon the calculation of the utilization of the transmission patterns.

8. The communication system according to claim 1, wherein the first processor is configured to:
   determine the plurality of transmission patterns randomly.

9. The communication system according to claim 1, wherein the first processor is configured to:
   determine, based on traffic information reported from the plurality of radio base stations, the allocation of radio resources for each of the plurality of transmission patterns.

10. The communication system according to claim 1, wherein the first processor is configured to:
   determine the allocation of radio resources for each of the transmission patterns including a transmission pattern in which a certain radio base station and another radio base station that are among the plurality of radio base stations coordinate with each other and execute joint transmission for terminals coupled to the certain radio base station.

11. The communication system according to claim 1, wherein the first processor is configured to:
   calculate throughput using a plurality of frequency resources; and
   determine, based on the results of the calculation, the transmission patterns and the allocation of radio resources for each of the plurality of frequency resources.

12. A radio base station in a communication system that includes a plurality of radio base stations and a control apparatus, at least parts of cells of two or more radio base stations among the plurality of radio base stations overlapping each other or being adjacent to each other, the radio base station comprising:
   a memory; and
   a processor coupled to the memory and the processor configured to:
      execute, based on control information, transmission control on a terminal that communicates with the radio base stations, the control information including information indicating an allocation of radio resources determined based on at least one of transmission patterns, the at least one transmission pattern that indicates a combination of transmission states for each of the plurality of radio base stations at a specified timing, at least one transmission state for one of the plurality of radio base stations, among the transmission states, indicating a state to decrease overlapping area of the cells,
   wherein a transmission pattern whose utilization is high from among the plurality of transmission patterns is selected, based on information that was measured by terminals coupled to at least one of the plurality of radio base stations and was acquired from the at least one of the plurality of radio base stations.

13. A control apparatus coupled to a plurality of radio base stations, at least parts of cells of two or more radio base stations among the plurality of radio base stations overlapping each other or being adjacent to each other, the control apparatus comprising:
   a memory; and
   a processor coupled to the memory and the processor configured to:
      select, based on information that was measured by terminals coupled to at least one of the plurality of radio base stations and was acquired from the at least one of the plurality of radio base stations, a transmission pattern whose utilization is high from among a plurality of transmission patterns, the transmission pattern that indicates a combination of transmission states for each of the plurality of radio base stations at a specified timing, at least one transmission state for one of the plurality of radio base stations, among the transmission states, indicating a state to decrease overlapping area of the cells; and
      transmit, to each of the plurality of radio base stations, control information including information that indicates an allocation of radio resources determined based on the selected transmission pattern.

14. A control method for a communication system including a plurality of radio base stations and a control apparatus, at least parts of cells of two or more radio base stations among the plurality of radio base stations overlapping each other or being adjacent to each other, the method comprising:
   selecting, by the control apparatus, a transmission pattern whose utilization is high from among a plurality of transmission patterns based on information that was measured by terminals coupled to at least one of the plurality of radio base stations and was acquired from the at least one of the plurality of radio base stations, the transmission pattern that indicates a combination of transmission states for each of the plurality of radio base stations at a specified timing, the at least one of transmission state for one of the plurality of radio base stations, among the transmission states, indicating a state to decrease overlapping area of the cells;
   transmitting, by the control apparatus, to each of the plurality of radio base stations, control information including information that indicates an allocation of radio resources determined based on the selected transmission pattern; and
   executing, by each of the plurality of radio base stations, based on the control information, transmission control on a terminal that communicates with each of the plurality of radio base stations.

* * * * *